United States Patent
Kawahara et al.

(10) Patent No.: US 11,528,080 B2
(45) Date of Patent: Dec. 13, 2022

(54) OPTICAL TRANSMISSION SYSTEM AND FAILURE DIAGNOSIS METHOD FOR OPTICAL TRANSMISSION SYSTEM

(71) Applicant: Nippon Telegraph and Telephone Corporation, Tokyo (JP)

(72) Inventors: Hiroki Kawahara, Musashino (JP); Toshiyuki Oka, Musashino (JP); Takeshi Seki, Musashino (JP); Toshihiko Seki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/295,533

(22) PCT Filed: Nov. 15, 2019

(86) PCT No.: PCT/JP2019/044972
§ 371 (c)(1),
(2) Date: May 20, 2021

(87) PCT Pub. No.: WO2020/110787
PCT Pub. Date: Jun. 4, 2020

(65) Prior Publication Data
US 2022/0021449 A1     Jan. 20, 2022

(30) Foreign Application Priority Data

Nov. 27, 2018 (JP) .............................. JP2018-221023

(51) Int. Cl.
*H04B 10/27* (2013.01)
*H04B 10/079* (2013.01)
*H04B 17/29* (2015.01)

(52) U.S. Cl.
CPC .......... *H04B 10/079* (2013.01); *H04B 10/27* (2013.01); *H04B 17/29* (2015.01)

(58) Field of Classification Search
CPC .... H04B 10/079; H04B 10/27; H04B 10/032; H04B 17/29
See application file for complete search history.

(56) References Cited

U.S. PATENT DOCUMENTS

| | | | |
|---|---|---|---|
| 2009/0234484 A1* | 9/2009 | Vacar ................... | G06F 11/008 700/110 |
| 2016/0204856 A1* | 7/2016 | Yin ...................... | H04B 10/032 398/5 |

(Continued)

OTHER PUBLICATIONS

Dong et al., "Optical Performance Monitoring: A Review of Current and Future Technologies," Journal Of Lightwave Technology, Jan. 15, 2016, 34(2):525-543.

*Primary Examiner* — Dzung D Tran
(74) *Attorney, Agent, or Firm* — Fish & Richardson P.C.

(57) ABSTRACT

[Problem] In an optical transmission system, a position and a cause of a failure are identified while avoiding tightness of processing on a network controller side.
[Solution] An optical transmission system 1 includes a plurality of nodes 4i to 4k interconnected by an optical transmission line, a plurality of node controllers 3i to 3k that detect degradation of signal quality at the nodes 4i to 4k, respectively, and determine a degradation mode correlated with the signal quality, and a network controller 2 that identifies a node or a component in which failure has occurred based on a node for which the node controller 3i to 3k has detected degradation of the signal quality, the degradation mode, a network topology formed of the nodes, and an optical path set between the nodes.

12 Claims, 15 Drawing Sheets

(56) References Cited

U.S. PATENT DOCUMENTS

2019/0188192 A1* 6/2019 Hayes ................ G05B 19/0421
2019/0236162 A1* 8/2019 Gross ................ G06F 16/2477
2019/0310617 A1* 10/2019 Li ........................ G06F 11/008

* cited by examiner

| CLASS | SUBCLASS | DSP-BASED OPM |
|---|---|---|
| TRANSMISSION LINE PROPERTY | WAVELENGTH DISPERSION | WAVELENGTH DISPERSION COMPENSATION AMOUNT |
| | POLARIZATION MODE DISPERSION | POLARIZATION MODE DISPERSION COMPENSATION AMOUNT STATE OF POLARIZATION VARIATION |
| | SOP | STOKES VECTOR CALCULATED FROM COEFFICIENT MATRIX OF 2×2 MIMO |
| APPARATUS/DEVICE PROPERTIES | OSNR | ERROR VECTOR MAGNITUDE (EVM) |
| | PDL | OSNR DIFFERENCE BETWEEN X AND Y |
| | CROSSTALK (INCLUDING REFLECTED LIGHT) | TAP VALUE OF FIR FILTER |
| | FIBER NON-LINEAR EFFECT | AUTO CORRELATION FUNCTION BETWEEN SYMBOLS |
| | ISI | TAP VALUE OF FIR FILTER |
| TRANSPONDER PROPERTY | CONSTELLATION DISTORTION | INDEX VALUE BASED ON GEOMETRIC FORM OF CONSTELLATION |
| | LIGHT SOURCE FREQUENCY | FREQUENCY OFFSET AMOUNT |
| | SPECTRUM SYMMETRY | INDEX VALUE BASED ON SPECTRUM SYMMETRY |

Fig. 11

|  | OPTICAL PATH #1 | OPTICAL PATH #2 | OPTICAL PATH #3 | OPTICAL PATH #4 | ... |
|---|---|---|---|---|---|
| OPTICAL PATH #1 |  | 0.3 | 0.2 | 0.1 | ... |
| OPTICAL PATH #2 | 0.3 |  | 0.99 | 0.25 | ... |
| OPTICAL PATH #3 | 0.2 | 0.99 |  | 0.2 | ... |
| OPTICAL PATH #4 | 0.1 | 0.25 | 0.2 |  | ... |
| ... |  |  |  |  |  |

Fig. 13

|  |  | FREQUENCY SLOT NO. | | | | | |
|---|---|---|---|---|---|---|---|
|  |  | #1 | #2 | #3 | #4 | #5 | ... |
| SECTION NO. | P | 0.6 |  | 0.95 |  |  |  |
|  | Q |  |  |  | 1 |  |  |
|  | R |  |  | 0.95 | 1 |  |  |
|  | S | 0.6 |  |  |  |  |  |
|  | T |  | 0.1 |  |  |  |  |
|  | U |  |  | 0.95 |  |  |  |
|  | V |  | 0.1 |  | 1 |  |  |
|  | ... |  |  |  |  |  |  |
| OXC NO. | A |  |  | 0.95 |  |  |  |
|  | B |  |  |  | 1 |  |  |
|  | C |  |  | 0.95 | 1 |  |  |
|  | D |  |  | 0.95 | 1 |  |  |
|  | E |  |  |  |  |  |  |
|  | F |  |  | 0.95 | 1 |  |  |
|  | G |  |  | 0.95 |  |  |  |
|  | H |  |  |  | 1 |  |  |

Fig. 14

OPTICAL TRANSMISSION SYSTEM AND FAILURE DIAGNOSIS METHOD FOR OPTICAL TRANSMISSION SYSTEM

CROSS-REFERENCE TO RELATED APPLICATIONS

This application is a National Stage application under 35 U.S.C. § 371 of International Application No. PCT/JP2019/044972, having an International Filing Date of Nov. 15, 2019, which claims priority to Japanese Application Serial No. 2018-221023, filed on Nov. 27, 2018. The disclosure of the prior application is considered part of the disclosure of this application, and is incorporated in its entirety into this application.

TECHNICAL FIELD

The present invention relates to an optical transmission system that diagnoses a failure of the optical transmission system itself, and a failure diagnosis method of an optical transmission system.

BACKGROUND ART

An optical transmission system includes an optical transmission layer in which a plurality of nodes are interconnected by links. In this optical transmission layer, photophysical properties and analog control properties interact in a complex manner, and a failure (abnormality) for which it is difficult to identify a failure (abnormal) position and a cause occurs. In particular, a non-linear property of an optical fiber generates an interaction between wavelength channels. In addition, a wavelength selective switch (WSS) and an optical amplifier perform level/gain control that equalizes signal qualities of all wavelength channels, and thus interactions are generated among the wavelength channels. Thus, an abnormality in a predetermined wavelength channel spreads to a signal quality in another wavelength channel, making it difficult to identify a position or a cause of a failure (abnormality) and performance degradation. In order to easily identify a position or a cause of a failure (abnormality) and performance degradation due to photophysical properties and analog control properties, it is necessary to take measures such as an increase in number of monitoring locations of the photophysical properties and the analog control properties, an increase in number of types of performance information to be monitored, and an improvement of time resolution in time-series data of performance information.

Non Patent Literature 1 describes current and future technologies related to optical performance monitoring.

CITATION LIST

Non Patent Literature

Non Patent Literature 1: Zhenhua Dong, Faisal Nadeem Khan, Qi Sui, Kangping Zhong, Chao Lu, and Alan Pak Tao Lau, "Optical Performance Monitoring: A Review of Current and Future Technologies", JOURNAL OF LIGHTWAVE TECHNOLOGY, IEEE, Jan. 15, 2016, VOL. 34, NO. 2

SUMMARY OF THE INVENTION

Technical Problem

A network controller of an optical transmission system collects statistical data of performance information from transponders and various monitoring devices at predetermined sampling intervals. For example, a sampling interval is limited to about 15 minutes to avoid processing tightness of the network controller. Thus, the network controller cannot detect a failure (abnormality) and performance degradation that shows a response that is shorter than this sampling interval.

When the sampling interval is shortened in order to detect a failure (abnormality) and performance degradation showing such a short response, processing of the network controller may be tightened and bring about a risk of congestion of a data communication network (DCN).

On the other hand, performance information collected by a related-art network controller includes optical power at input and output of an optical device, parameter values that control the optical power (e.g., an attenuation amount of light of a wavelength selective switch, a laser bias current, and the like), a device temperature, and the like. In this case, the network controller can only detect a failure (abnormality) and performance degradation that indicate temporal variations in optical signal power and temporal variations in the device temperature. Thus, in the optical transmission system, for most of failures that occur due to photophysical properties and analog control properties, it is difficult to identify a failure position or a cause. In the context described above, an object of the present invention is to identify a position and a cause of a failure while avoiding tightness of processing on a network controller side and congestion of a data communication network, in an optical transmission system.

Means for Solving the Problem

In order to solve the problems described above, an invention according to a first aspect is an optical transmission system including: a plurality of nodes interconnected by an optical transmission line: a plurality of determination units each configured to detect degradation of signal quality at each of the plurality of nodes, identify time-series data of photophysical properties correlated with time-series data of the signal quality, and determine a degradation mode: and a network controller configured to identify a node or a component in which a failure or performance degradation has occurred based on a node for which a determination unit of the plurality of determination units has detected degradation of the signal quality, the degradation mode, a network topology formed of the plurality of nodes, and information on optical paths set between the plurality of nodes.

In this way, according to the present invention, it is possible to identify a position and a cause of a failure while avoiding tightness of processing on the network controller side and congestion of the data communication network.

An invention according to a second aspect is the optical transmission system according to the first aspect in which he plurality of determination units each, upon detecting degradation of the signal quality, determine a correlation between a photophysical property and the signal quality over a predetermined period of time before and after a detected timing.

In this way, according to the present invention, it is possible to suppress computation amounts of the determination units.

An invention according to a third aspect is the optical transmission system according to the first or second aspect in which the determination unit is a node controller configured to manage a node or a component for which degradation of the signal quality has been detected.

In this way, according to the present invention, a failure cause is diagnosed via each node controller, and thus it is possible to perform dispersion processing regardless of performance of the transponder.

An invention according to a fourth aspect is the optical transmission system according to the first or second aspect in which the determination unit is a transponder provided in a node in which degradation of the signal quality has been detected.

In this way, according to the present invention, the transponder can perform dispersion processing without providing a node controller.

An invention according to a fifth aspect is the optical transmission system according to the third or fourth aspect in which a cause of a failure in the node or the component is diagnosed based on time-series data of an attenuation amount of light applied to an optical signal constituting each of the optical paths and passing through the node, or time-series data of optical power.

In this way, according to the present invention, it is possible to diagnose a cause of a failure of a component constituting a node.

An invention according to a sixth aspect is the optical transmission system according to the first aspect in which each of the plurality of nodes is an optical cross connect through which optical signals of a plurality of frequency slots pass, the network controller collects time-series data of a photophysical property corresponding to the degradation mode from a determination unit of the plurality of determination units that is configured to manage a node serving as an end of each of optical buses to compute a correlation coefficient matrix between optical paths and identifies a most upstream node of nodes common to combinations of optical paths having a correlation coefficient exceeding a threshold value as a suspected location related to a failure or performance degradation.

In this way, according to the present invention, the optical transmission system can mechanically determine a node of a suspected location of a failure or performance degradation.

An invention according to a seventh aspect is the optical transmission system according to any one of the first to sixth aspect in which the time-series data of the photophysical property correlated with time-series data of the signal quality includes at least one selected from the group consisting of time-series data of a wavelength dispersion compensation amount, time-series data of a polarization mode dispersion compensation amount, time-series data of a state of polarization (SOP), time-series data of a signal-to-noise ratio, time-series data of a polarization-dependent loss, time-series data of crosstalk, time-series data of a fiber non-linear effect, time-series data of inter-symbol interference, time-series data of constellation distortion, time-series data of a light source frequency, and time-series data of spectrum symmetry.

In this way, according to the present invention, it is possible to easily determine a failure of an apparatus or an optical transmission line.

An invention according to an eighth aspect is a failure diagnosis method performed by an optical transmission system including a plurality of nodes interconnected by an optical transmission line, management units each configured to manage each of the plurality of nodes, and a network controller configured to comprehensively manage the management units, the method including: determining, by the management units, a degradation mode by detecting a degradation of signal quality in a nodes of the plurality of nodes and identifying time-series data of a photophysical property correlated with time-series data of the signal quality, and identifying, by the network controller, a node or component in which a failure or performance degradation has occurred based on a node for which the management units have detected degradation of the signal quality, the degradation mode, a network topology formed of the plurality of nodes, and information on optical paths set between the plurality of nodes.

In this way, according to the present invention, it is possible to identify a position and a cause of a failure while avoiding tightness of processing on the network controller side and congestion of the data communication network.

Effects of the Invention

According to the present invention, it is possible to identify a position and a cause of a failure while avoiding tightness of processing on a network controller side and congestion of a data communication network.

BRIEF DESCRIPTION OF DRAWINGS

FIG. 11 is a diagram illustrating feature amounts monitored by a digital signal processing (DSP) chip.

FIG. 13 is a two-dimensional map of optical paths.

FIG. 14 is a diagram illustrating that marks are given to a two-dimensional map including a frequency slot number, a section number, and an OXC number.

DESCRIPTION OF EMBODIMENTS

Embodiments of the present invention will be described below with reference to the drawings.

Figure 1:
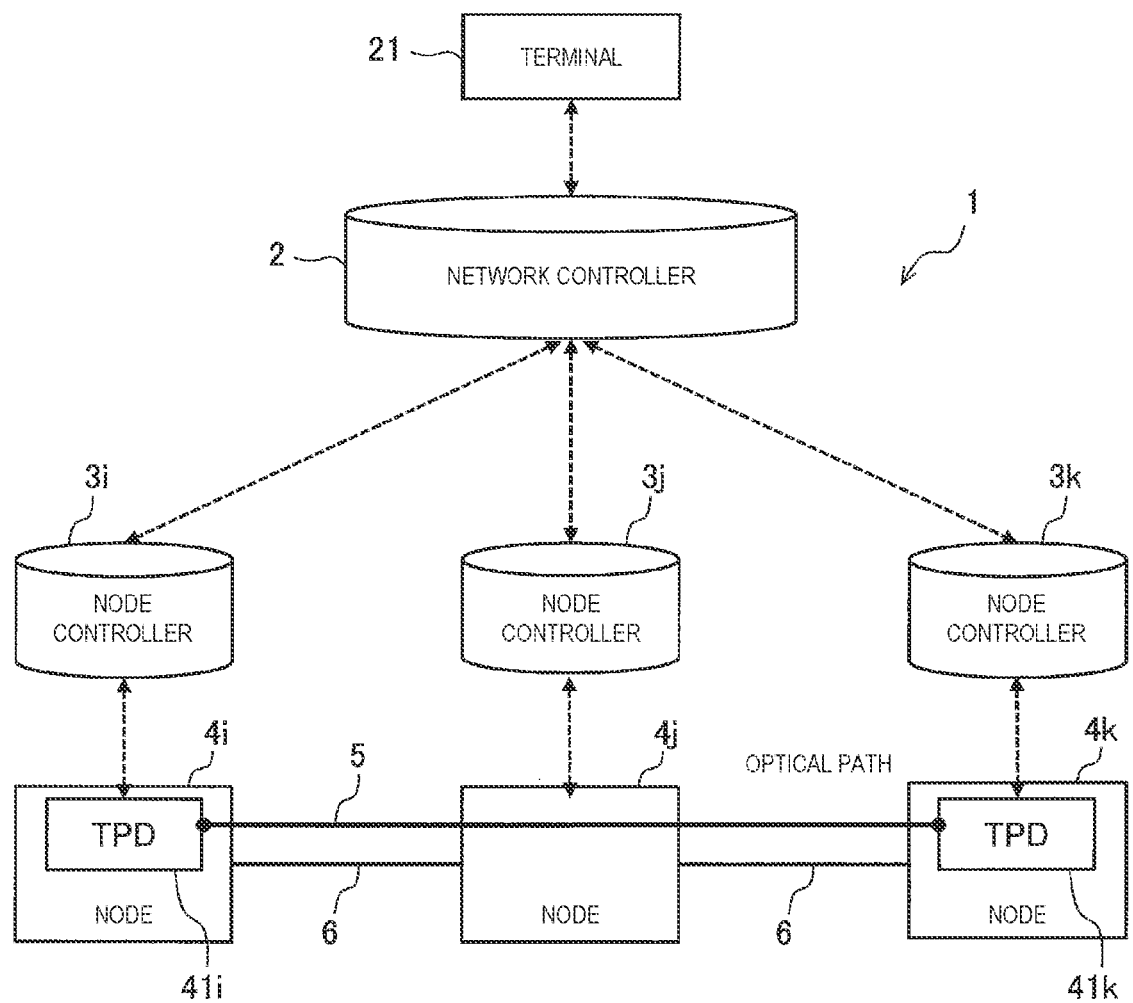
FIG. 1 is a conceptual diagram of an optical transmission system according to a first embodiment.

FIG. 1 is a conceptual diagram illustrating an optical transmission system 1 according to a first embodiment.

The optical transmission system 1 includes a plurality of nodes 4i to 4k interconnected by an optical fiber 6, which is an optical transmission line, and further includes node controllers 3i to 3k and a network controller 2.

Transponders 41i, 41k each are described as "TPD" in each drawing. The transponder 41i included in the node 4i and the transponder 41k included in the node 4k are communicatively connected by an optical path 5. The optical path 5 is a logical communication line that connects the transponder 41i and the transponder 41k via the optical fiber 6, which is a physical communication line, and the node 4j. Hereinafter, the nodes are simply described as a node 4 when the nodes 4i to 4k are not distinguished from each other. The transponders are simply described as a transponder 41 when the transponders 41i, 41k are not distinguished from each other.

The node controller 3i controls and monitors the transponder 41i to detect degradation of signal quality, and determines a degradation mode correlated with the signal quality.

The node controller 3j controls and monitors the node 4j to detect degradation of signal quality, and determines a degradation mode correlated with the signal quality.

The node controller 3k controls and monitors the transponder 41k to detect degradation of signal quality, identifies a photophysical property correlated with time-series data of the signal quality, and determines a degradation mode. These node controllers 3i to 3k are determination units for detecting degradation of signal quality in the nodes 4i to 4k, respectively, identifying a photophysical property correlated with time-series data of the signal quality, and determining a degradation mode. Hereinafter, the node controllers are simply described as a node controller 3 when the node controllers 3i to 3k are not distinguished from each other.

The network controller 2 is connected to the node controllers 3i to 3k via a data communication network. The network controller 2 controls and monitors the node controllers 3i to 3k. The network controller 2 identifies a node or a component in which a failure (abnormality) or performance degradation has occurred based on nodes for which the node controllers 3i to 3k have detected degradation of the signal quality, a degradation mode, a network topology formed of a plurality of the nodes 4, and the optical path 5 set between the nodes 4. A terminal 21 is connected to the network controller 2 to notify a user of, for example, a failure position or a cause.

Figure 2:
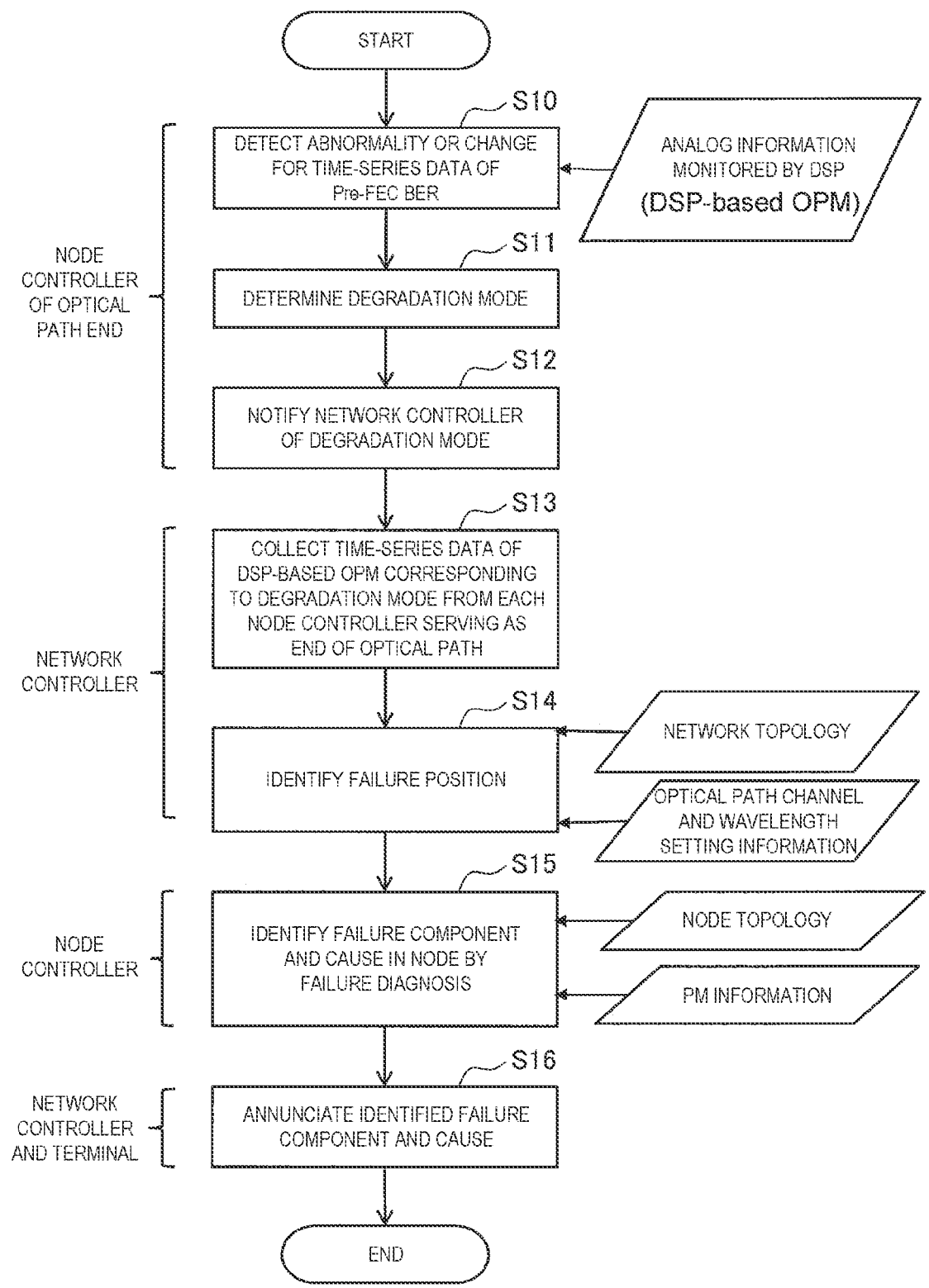
FIG. 2 is a flowchart of failure position identification and failure cause identification.

FIG. 2 is a schematic flowchart illustrating failure diagnostic processing.

Steps S10 to S12 are processes performed by the node controller 3 located at an end of the optical path 5. The node controller 3 located at the end of the optical path 5 corresponds to the node controllers 3i, 3k in FIG. 1.

When the node controller 3 located at the end of the optical path 5 detects an abnormality or change in time-series data of a pre-forward error correction bit error rate (Pre-FEC BER) of the node 4 to be monitored (S10), it determines a degradation mode thereof based on a correlation analysis between the time-series data of the Pre-FEC BER and time-series data of analog information regarding photophysical properties to be monitored by digital signal processing (DSP) (S11). The following describes the analog information regarding the photophysical properties as digital signal processing-based optical performance monitoring (DSP-based OPM). Here, an abnormality in the time-series data of the Pre-FEC BER indicates that the quality of a signal flowing through the optical path 5 has degraded.

The node controller 3 further notifies the network controller 2 of the identified degradation mode (S12).

Steps S13 and S14 are processes performed by the network controller 2 that comprehensively controls the optical transmission system 1.

When the network controller 2 collects time-series data of the DSP-based OPM corresponding to the degradation mode from each of the node controllers 3 serving as ends of the optical path 5 (S13), the network controller 2 identifies one of the nodes 4 or a position in the optical fiber 6 in which a failure or performance degradation has occurred based on the network topology information, the optical path channel, and wavelength setting information (S14).

Step S15 is a process performed by the node controller 3 managing anode 4 if a location at which a failure has occurred is the node 4. The node controller 3 diagnoses a failure based on topology information in the node or performance monitoring (PM) information, and identifies a failure component and cause in the node (S15).

Step S16 is a process performed by the network controller 2 and the terminal 21. The network controller 2 collects the identified failure component information and cause information from the node controller 3, causes the terminal 21 to annunciate the failure component and cause (S16), and terminates the processing in FIG. 2.

Hereinafter, with reference to FIGS. 3 to 17, a specific means of achieving rapid identification of a failure position and a cause will be explained for a failure in which signal quality of a target channel and another channel has been affected due to an output abnormality of a wavelength selective switch included in an optical cross connect.

Figure 3:
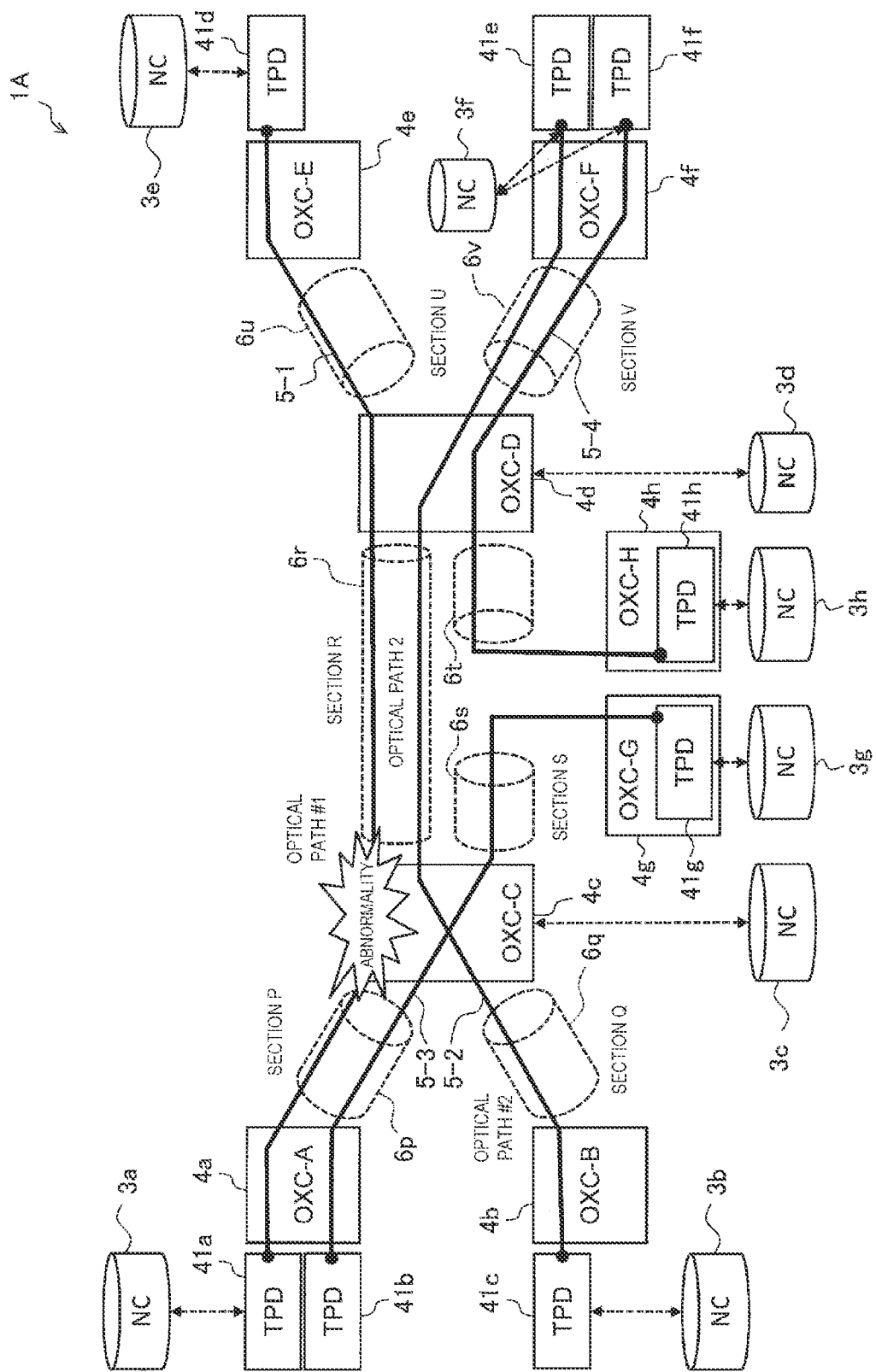
FIG. 3 is a diagram illustrating that an abnormality has occurred in an optical transmission system.

FIG. 3 is a diagram illustrating that an abnormality has occurred in an optical transmission system 1A.

This optical transmission system 1A is configured in which optical cross connects 4a to 4h are interconnected by an optical fiber of sections 6p to 6v and node controllers 3a to 3h are connected to these optical cross connects 4a to 4h. These sections 6p to 6v are optical transmission lines that interconnect the nodes.

The optical cross connect 4a includes transponders 41a. 41b and is interconnected to the optical cross connect 4c by the optical fiber of the section 6p. The optical cross connect 4a and the transponders 41a, 41b are hardware constituting the node 4. The node controller 3a of the first embodiment executes software for controlling the optical cross connect 4a and the transponders 41a, 41b and thus is a server equipped with a computing resource that realizes a function of monitoring the time-series data of the correlation coefficient between the signal quality and the DSP-based OPM and determining a degradation mode.

Note that the network controller 2 and the node controller 3a identify the optical cross connect 4a as an "OXC-A" and identify the section 6p as a "section P".

The optical cross connect 4b includes a transponder 41c and is interconnected to the optical cross connect 4c by the optical fiber of the section 6q. The optical cross connect 4b and the transponder 41c are hardware constituting the node 4. The node controller 3b of the first embodiment execute software for controlling the optical cross connect 4b and the transponder 41c and thus is a server equipped with a computing resource that realizes a function of monitoring the time-series data of the correlation coefficient between the signal quality and the DSP-based OPM and determining a degradation mode. Note that the network controller 2 and the node controller 3b identify the optical cross connect 4b as an "OXC-B" and identify the section 6q as a "section Q".

The optical cross connect 4c is interconnected to the optical cross connect 4a by the optical fiber of the section 6p and is interconnected to the optical cross connect 4b by the optical fiber of the section 6q.

The optical cross connect 4c is further interconnected to the optical cross connect 4d by the optical fiber of the section 6r and is interconnected to the optical cross connect 4g by the optical fiber of the section 6s. The optical cross connect 4d is hardware constituting the node 4. The node controller 3d of the first embodiment executes software for controlling the optical cross connect 4d and thus is a server equipped with a computer resource that realizes a function of monitoring time-series data of the correlation coefficient between the signal quality and the DSP-based OPM and determining a degradation mode. Note that the network controller 2 and the node controller 3c identify the optical cross connect 4c as an "OXC-C", identify the section 6r as a "section R", and identify the section 6s as a "section S".

The optical cross connect 4d is interconnected to the optical cross connect 4e by the optical fiber of the section 6u and is interconnected to the optical cross connect 4f by the optical fiber of the section 6v.

Note that the network controller 2 and the node controller 3d identify the optical cross connect 4d as an "OXC-D". In addition, the network controller 2 and node controller 3d identify the section 6u as a "section U" and identify the section 6v as a "section V".

The optical cross connect 4e includes a transponder 41d and is interconnected to the optical cross connect 4d by the optical fiber of the section 6u. The optical cross connect 4e and the transponder 41d are hardware constituting the node 4. The node controller 3e of the first embodiment executes software for controlling the optical cross connect 4e and the transponder 41d and thus is a server equipped with a computing resource that realizes a function of monitoring the time-series data of the correlation coefficient between the signal quality and the DSP-based OPM and determining a degradation mode.

Note that the network controller 2 and the node controller 3e identify the optical cross connect 4e as an "OXC-E". In addition, the network controller 2 and the node controller 3e identify the section 6u as a "section U".

The optical cross connect 4f includes transponders 41e, 41f and is interconnected to the optical cross connect 4d by the optical fiber of the section 6v. The optical cross connect 4f and the transponders 41e, 41f are hardware constituting the node 4. The node controller 3f of the first embodiment executes software for controlling the optical cross connect 4f and the transponders 41e, 41f and thus is a server equipped with a computing resource that realizes a function of monitoring the time-series data of the correlation coefficient between the signal quality and the DSP-based OPM and determining a degradation mode.

Note that the network controller 2 and the node controller 3f identify the optical cross connect 4f as an "OXC-F". Furthermore, the network controller 2 and the node controller 3f identify the section 6v as a "section V".

The optical cross connect 4g includes a transponder 41g and is interconnected to the optical cross connect 4c by the optical fiber of the section 6s. The optical cross connect 4g and the transponder 41g are hardware constituting the node 4. The node controller 3g of the first embodiment executes software for controlling the optical cross connect 4g and the transponder 41g and thus is a server equipped with a computing resource that realizes a function of monitoring the time-series data of the correlation coefficient between the signal quality and the DSP-based OPM and determining a degradation mode.

Note that the network controller 2 and the node controller 3g identify the optical cross connect 4g as an "OXC-G". In addition, the network controller 2 and the node controller 3g identify the section 6s as a "section S".

The optical cross connect 4h includes a transponder 41h, and is interconnected to the optical cross connect 4d by the optical fiber of the section 6t. The optical cross connect 4h and the transponder 41h are hardware constituting the node 4. The node controller 3h of the first embodiment executes software for controlling the optical cross connect 4h and the transponder 41h and thus is a server equipped with a computing resource that realizes a function of monitoring the time-series data of the correlation coefficient between the signal quality and the DSP-based OPM and determining a degradation mode.

Note that the network controller 2 and the node controller 3h identify the optical cross connect 4h as an "OXC-H". In addition, the network controller 2 and the node controller 3h identify the section 6t as a "section T".

The optical path 5-1 is a logical communication line connecting one end to the other end of the optical transmission system 1A, is terminated in the transponder 41a of the optical cross connect 4a, and is further terminated to the transponder 41d of the optical cross connect 4d. The optical path 5-1 leads from the optical cross connect 4a to the optical cross connect 4d via the section 6p, the optical cross connect 4c, and the section 6r, and further to the optical cross connect 4d via the section 6u.

The optical path 5-2 is a logical communication line connecting one end to the other end of the optical transmission system 1A, is terminated in the transponder 41c of the optical cross connect 4b, and is further terminated to the transponder 41e of the optical cross connect 4f The optical path 5-2 leads from the optical cross connect 4b to the optical cross connect 4d via the section 6q, the optical cross connect 4c, and the section 6r, and further to the optical cross connect 4f via the section 6v.

The optical path 5-1 and the optical path 5-2 are communication lines having different wavelength channels, sharing the optical cross connect 4c, the section 6r, and the optical cross connect 4d.

The optical path 5-3 is a logical communication line connecting one end to the other end of the optical transmission system 1A, is terminated in the transponder 41b of the optical cross connect 4a, and is further terminated in the transponder 41g of the optical cross connect 4g. The optical path 5-3 leads from the optical cross connect 4a to the transponder 41 of the optical cross connect 4g via the section 6p, the optical cross connect 4c, and the section 6s.

The optical path 5-1 and the optical path 5-3 are communication lines having different wavelength channels, sharing the optical cross connect 4a, the section 6p, and the optical cross connect 4c. The optical path 5-2 and the optical path 5-3 are communication lines having different wavelength channels, sharing the optical cross connect 4c.

The optical path 5-4 is a logical communication line connecting one end to the other end of the optical transmission system 1A, is terminated in the transponder 41f of the optical cross connect 4f, and is further terminated in the transponder 41h of the optical cross connect 4h. The optical path 5-4 leads from the optical cross connect 4f to the transponder 41h of the optical cross connect 4h via the section 6v, the optical cross connect 4d, and the section 6t.

The optical path 5-1 and the optical path 5-4 are communication lines having different wavelength channels, sharing the optical cross connect 4d. The optical path 5-2 and the optical path 5-4 are communication lines having different wavelength channels, sharing the optical cross connect 4d, the section 6v, and the optical cross connect 4f.

Note that the network controller 2 and the node controller 3 (see FIG. 1) recognize the optical path 5-1 as an "optical path #1", recognize the optical path 5-2 as an "optical path #2", recognize the optical path 5-3 as an "optical path #3", and recognize the optical path 5-4 as an "optical path #4".

As illustrated in FIG. 3, when an output power abnormality of the wavelength selective switch included in the optical cross connect 4c occurs, setting of the wavelength selective switch for the optical path 5-1 becomes abnormal. As a result, a fiber input power of the corresponding optical path 5-1 increases, and influence of a non-linear effect due to self-phase modulation increases. At the same time, the optical path 5-2 passing through the same section 6r and having an adjacent wavelength is increasingly affected by a non-linear effect due to cross-phase modulation. As a result, degradation of signal quality occurs at each of the ends of the optical path 5-1 and the optical path 5-2.

To detect such degradation of signal quality and to identify a degradation mode of the signal quality, the node controller 3 that monitors the transponder 41 serving as an end point of each of the optical paths 5-1 to 5-4 monitors the correlation coefficient between the time-series data of the Pre-FEC BER and the time-series data of various DSP-based OPM. Then, the DSP-based OPM having a large correlation coefficient is extracted to identify the degradation mode.

These monitoring processes are performed within the node controller 3 that monitors the transponder 41. This can reduce the load on the network controller 2 side and avoid congestion of the data communication network.

Figure 4:
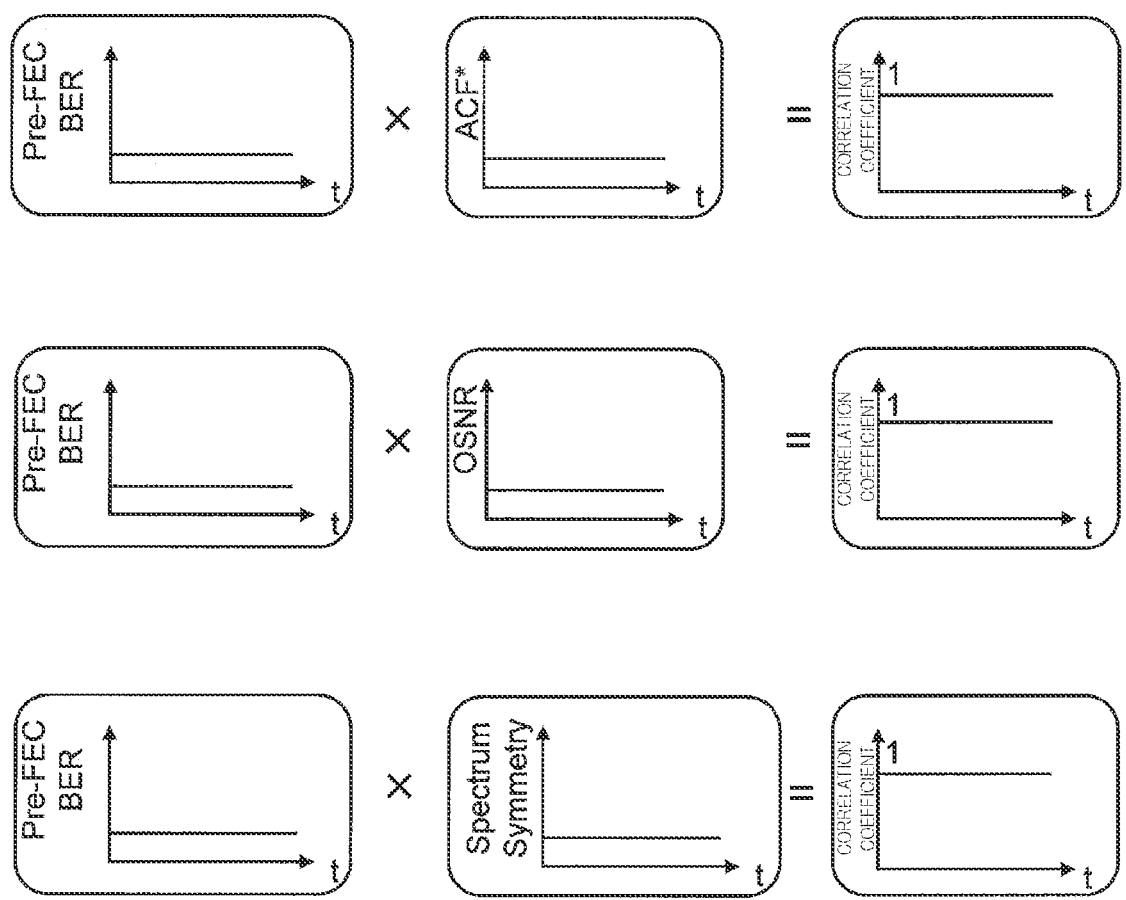
FIG. 4 is a set of graphs illustrating time-series data of a bit error rate before error correction at normal time, time-series data of DSP monitor feature amounts, and time-series data of their correlation coefficient.

FIG. 4 is a set of graphs illustrating time-series data of a bit error rate before error correction at normal time, time-series data of DSP-based OPM, and time-series data of their correlation coefficients.

Of these graphs, three on the left each illustrate time-series data of Pre-FEC BER, and three on the middle illustrate time-series data of various DSP-based OPM. Of these graphs, three on the right each illustrate a correlation coefficient between the time-series data of Pre-FEC BER illustrated in the right graph of each row and the time-series data of various DSP-based OPM illustrated in the middle graph.

In the first row, time-series data of Pre-FEC BER, time-series data of an auto correlation function (ACF), and time-series data of a correlation coefficient that is a result obtained by computing a correlation thereof are illustrated. The time-series data of Pre-FEC BER remains a predetermined value and does not vary. The time-series data of ACF also remains a predetermined value and does not vary. Thus, the time-series data of the correlation coefficient thereof also remains 1 and does not vary.

In the second row, time-series data of Pre-FEC BER, time-series data of an optical signal to noise ratio (OSNR), and time-series data of a correlation coefficient which is a result obtained by computing a correlation thereof are illustrated. The time-series data of Pre-FEC BER remains a predetermined value and does not vary. The time-series data of OSNR also remains a predetermined value and does not vary. Thus, the time-series data of the correlation coefficient thereof also remains 1 and does not vary.

In the third row, time-series data of Pre-FEC BER, time-series data of a spectrum symmetry, and time-series data of a correlation coefficient that is a result obtained by computing a correlation thereof are illustrated. The time-series data of Pre-FEC BER remains a predetermined value and does not vary. The time-series data of spectrum symmetry also remains a predetermined value and does not vary. Thus, the time-series data of the correlation coefficient thereof also remains 1 and does not vary.

Figure 5:
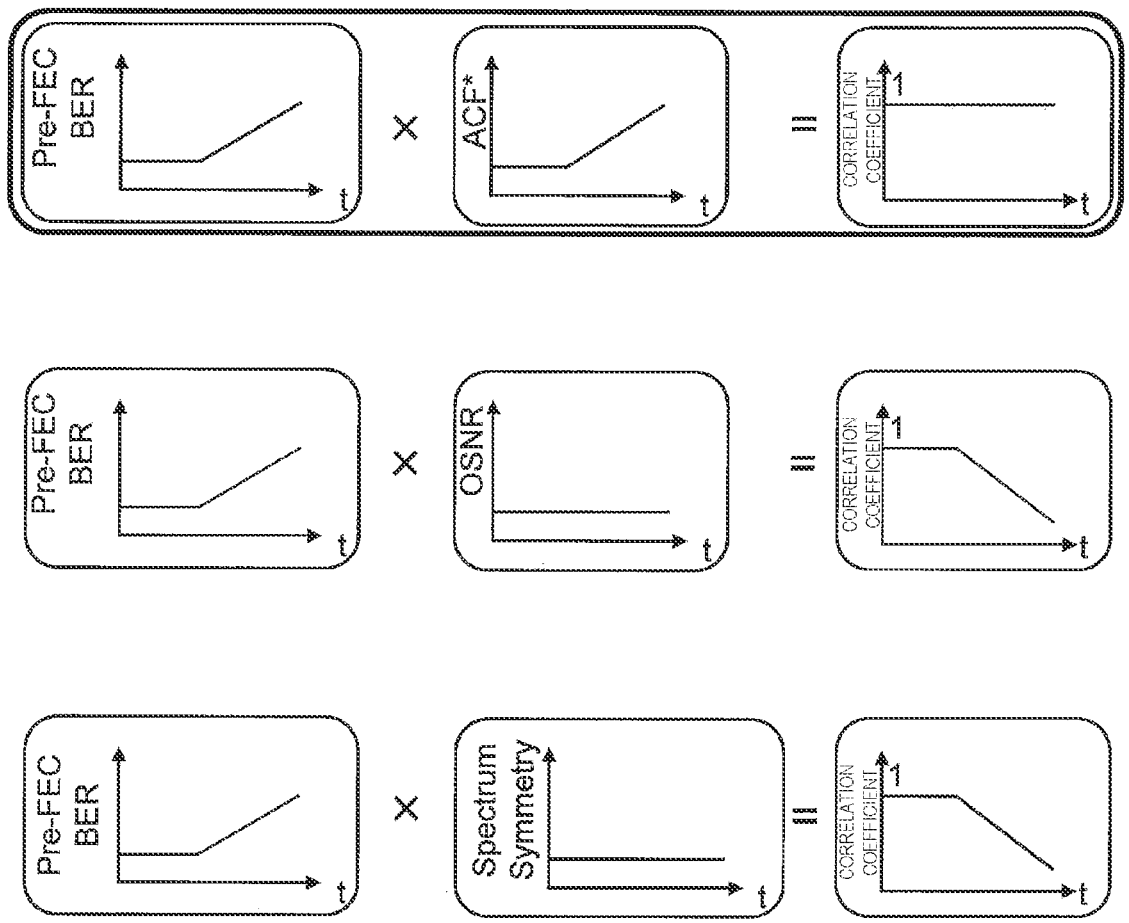
FIG. 5 is a set of graphs illustrating time-series data of a bit error rate before error correction at the time of abnormality, time-series data of DSP monitor feature amounts, and time-series data of their correlation coefficient.

FIG. 5 is a set of graphs illustrating time-series data of a bit error rate before error correction at the time of abnormality, time-series data of DSP-based OPM, and time-series data of their correlation coefficient.

In the first row, time-series data of Pre-FEC BER, time-series data of ACF, and time-series data of a correlation coefficient that is a result obtained by computing a correlation thereof are illustrated. The time-series data of Pre-FEC BER is increased at a predetermined timing, indicating that signal quality has degraded. The time-series data of ACF is also increased at this predetermined timing. Thus, the time-series data of the correlation coefficient thereof also remains 1 and does not vary.

In the second row, time-series data of Pre-FEC BER, time-series data of OSNR, and time-series data of a correlation coefficient that is a result obtained by computing a correlation thereof are illustrated. The time-series data of Pre-FEC BER is increased at a predetermined timing, indicating that signal quality has degraded. The time-series data of OSNR remains a predetermined value and does not vary. Thus, the time-series data of the correlation coefficient thereof gradually decreases from 1 after the predetermined timing.

In the third row, time-series data of Pre-FEC BER, time-series data of a spectrum symmetry, and time-series data of a correlation coefficient that is a result obtained by computing a correlation thereof are illustrated. The time-series data of Pre-FEC BER is increased at a predetermined timing, indicating that signal quality has degraded. The time-series data of the spectrum symmetry remains a predetermined value and does not vary. Thus, the time-series data of the correlation coefficient thereof decreases gradually from 1 after the predetermined timing.

Here, of the time-series data of various DSP-based OPM, time-series data having a correlation with the time-series data of Pre-FEC BER before and after the abnormality occurs is the time-series data of ACF. Thus, it can be identified that a failure factor and a failure location are what are related to an increase in ACF.

Figure 6:
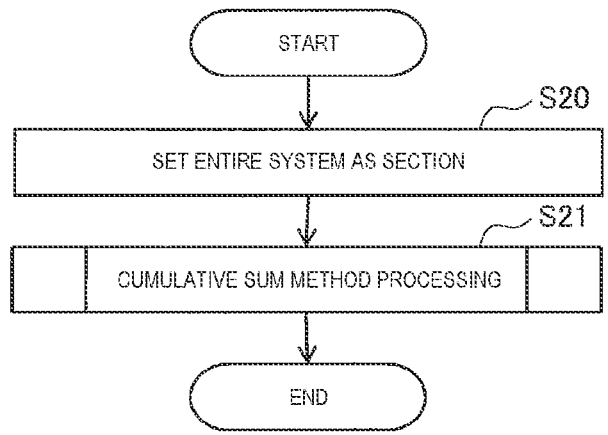
FIG. 6 is a flowchart illustrating processing of abnormality/change detection.
Figure 7:
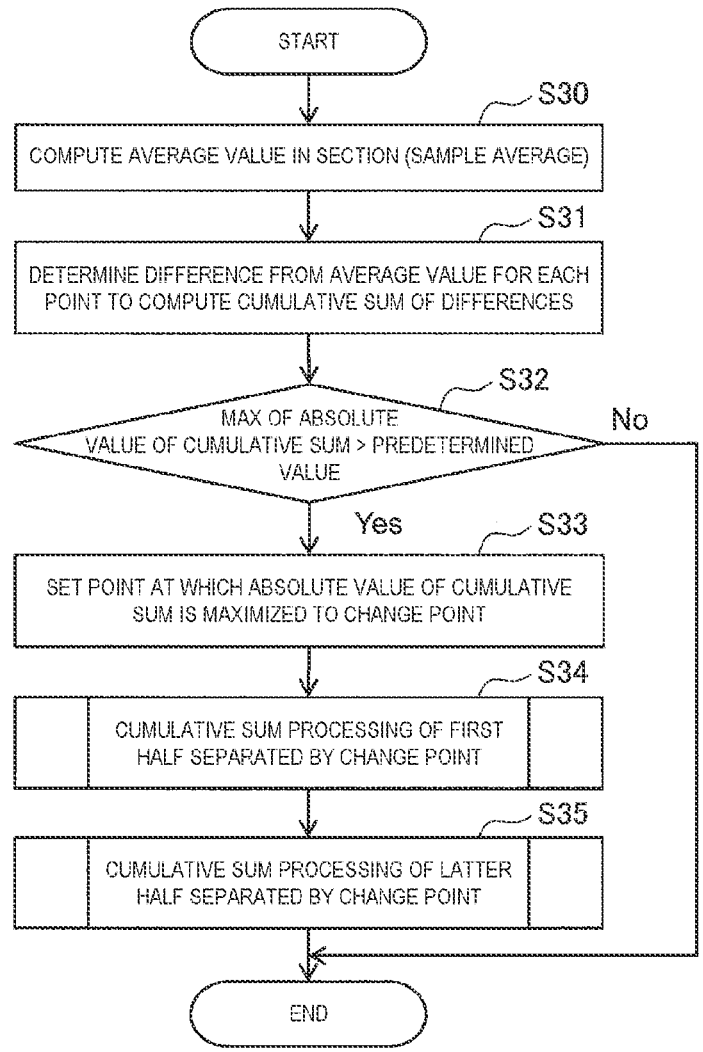
FIG. 7 is a flowchart illustrating recursive processing of abnormality/change detection.

FIGS. 6 and 7 each are a flowchart illustrating an abnormality/change detection processing.

Although there are various algorithms for abnormality/change detection processing, a cumulative sum method, which is a classic change point algorithm, will be described here. Note that other algorithms may be applied.

First, the node controller 3 (see FIG. 1) sets the entire system as a section to be processed (S20) and performs cumulative sum processing on the set section (S21). This cumulative sum processing is recursive processing illustrated in FIG. 7.

As illustrated in FIG. 7, the node controller 3 computes an average value (sample average) in a section to be processed (S30). The node controller 3 determines a difference from the average value for each point and computes a cumulative sum of differences from the average value (S31). Thereafter, the node controller 3 compares the maximum of the absolute value of the cumulative sum with a predetermined value (threshold value) (S32). If the maximum of the absolute value of the cumulative sum is less than or equal to the predetermined value (No), the node controller 3 terminates the detection processing. If the maximum of the absolute value of the cumulative sum exceeds the predetermined value (Yes), the node controller 3 proceeds to processing in step S33.

In step S33, the node controller 3 sets a point (timing) at which the absolute value of the cumulative sum is maximized to a new change point.

In step S34, the node controller 3 recursively invokes this cumulative sum method processing with a first half of the section to be processed as a new section, the first half being separated by the change point detected in step S33.

In step S35, the node controller 3 terminates the processing of FIG. 7 after recursively invoking this cumulative sum method processing with a latter half of the section to be processed as a new section, the latter half being separated by the change point detected in step S33.

Figure 8:
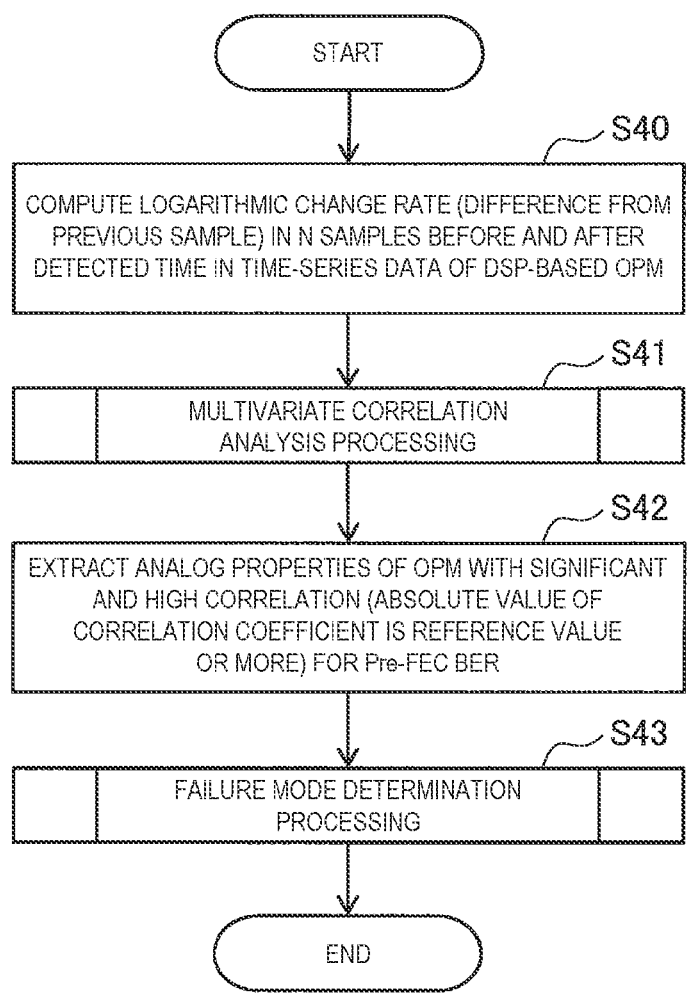
FIG. 8 is a flowchart illustrating analytical processing in a case w % here an abnormality/change has been detected.

FIG. 8 is a flowchart illustrating analytical processing in a case where an abnormality/change has been detected.

The node controller 3 computes a logarithmic change rate (difference from a previous sample) in N samples before and after the detection time in the time-series data of various DSP-based OPM (S40), and invokes multivariate correlation analysis processing (see FIG. 9) (S41).

Thereafter, the node controller 3 extracts DSP-based OPM having a significant and high correlation (where the absolute value of the correlation coefficient is greater than or equal to a reference value) for Pre-FEC BER (S42). This extraction processing is the operation described in FIGS. 5 and 6 described above. In this way, the node controller 3 terminates the processing of FIG. 8 after determining a degradation mode.

Figure 9:
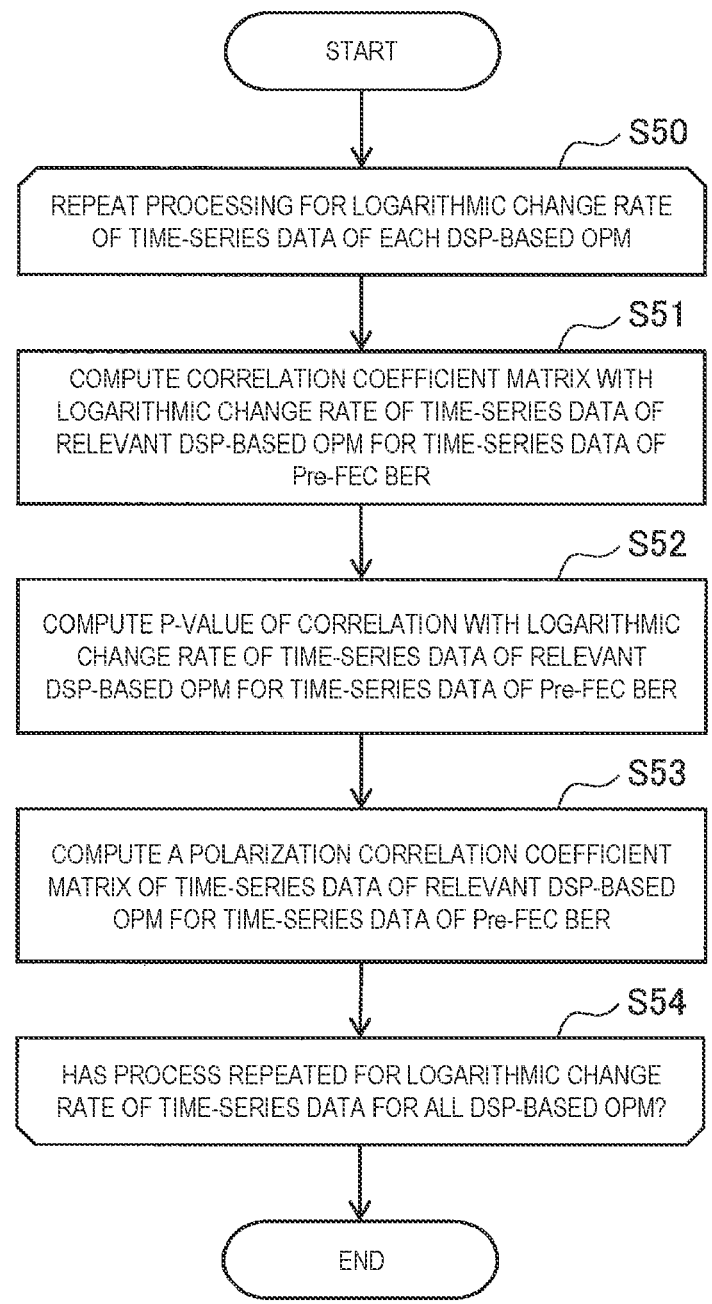
FIG. 9 is a flowchart illustrating multivariate correlation analysis processing.

FIG. 9 is a flowchart illustrating multivariate correlation analysis processing.

In steps S50 to S54, the node controller 3 repeats each processing for the logarithmic change rate of the time-series data of various DSP-based OPM.

In step S51, the node controller 3 computes a correlation coefficient matrix of the time-series data of the relevant DSP-based OPM for the time-series data of Pre-FEC BER.

In step S52, the node controller 3 computes a p-value of the correlation with the logarithmic change rate of the time-series data of the relevant DSP-based OPM for the time-series data of Pre-FEC BER. By comparing this p-value to a significance level a, it can be determined whether the correlation is significant. For example, the significance level a of 0.05 indicates that there is a risk of 5% that it is concluded that there is a correlation although there is actually no correlation.

In step S53, the node controller 3 computes a partial correlation coefficient matrix of the time-series data of the relevant DSP-based OPM data for the time-series data of Pre-FEC BER.

By referring to this partial correlation coefficient matrix, it is possible to avoid pseudo-correlation and pseudo-uncorrelation due to influence of a third variable.

In step S54, the node controller 3 returns to step S50 if time-series data of any of DSP-based OPM has not processed. Once the time-series data of all the DSP-based OPM has been processed, the node controller 3 terminates the processing of FIG. 9.

Only when a change has been detected, the node controller 3 calculates the correlation coefficient using time-series data of a time interval before and after detection, so that it is possible to suppress processing load of the detection.

Figure 10:
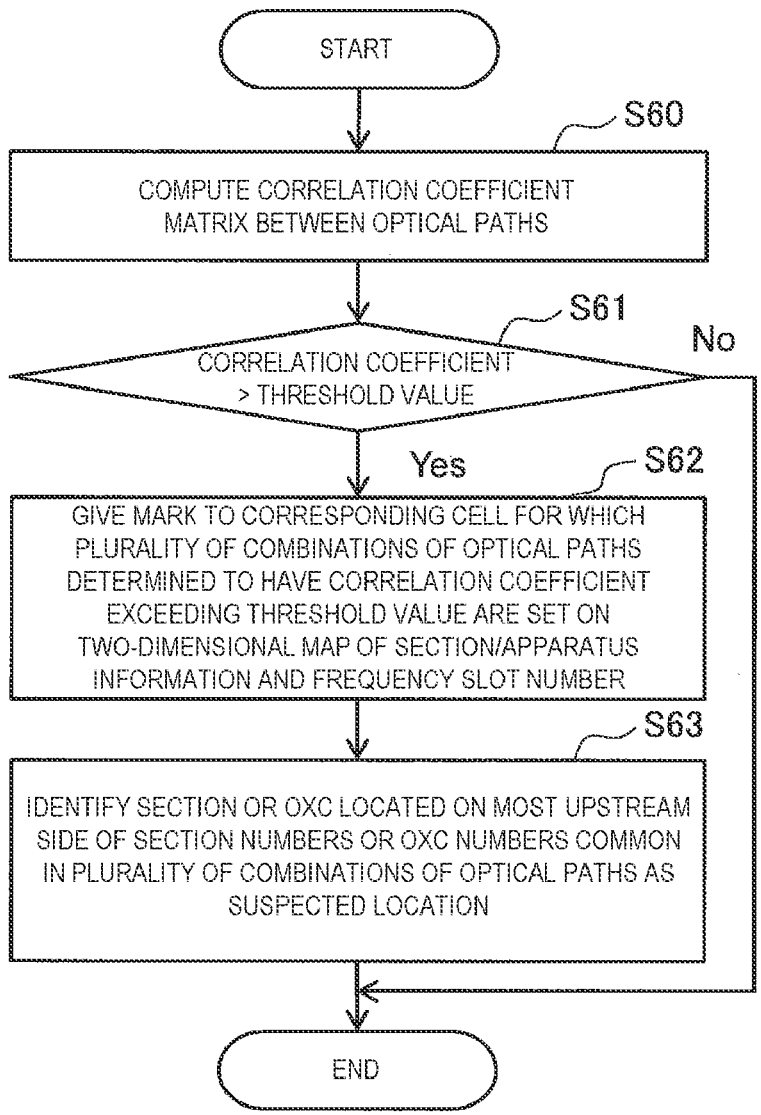
FIG. 10 is a flowchart illustrating failure mode identification processing.

FIG. 10 is a flowchart illustrating processing of failure location identification.

As illustrated in FIG. 1, the network controller 2 collects the time-series data of DSP-based OPM corresponding to the degradation mode from the node controllers each of which manages a node serving as an end of the optical path (S13). Thereafter, the network controller 2 computes a correlation coefficient matrix between optical paths (S60) and determines whether the correlation coefficient exceeds a threshold value (S61). A computation example of the correlation coefficient matrix is illustrated in FIG. 13. Numerical values in cells each indicate a correlation between an optical path in a relevant row and an optical path in a relevant column of the time-series data of DSP-based OPM related to the degradation mode. For example, when the threshold value is set to 0.8, it is determined that the correlation coefficients of the optical path #2 and the optical path #3 exceed the threshold value. The network controller 2 terminates the processing described in FIG. 10 if the correlation coefficient does not exceed the threshold value.

Next, the network controller 2 gives a mark to a corresponding cell having a frequency slot number, section number, and OXC number for which a plurality of combinations of optical paths determined to have a correlation coefficient greater than a threshold value are set on a two-dimensional map of section/apparatus information and frequency slot number (S62). An example of the two-dimensional map is illustrated in FIG. 14. In FIG. 14, it is assumed that the optical path #2 corresponds to the frequency slot number #3, and the optical path #3 corresponds to the frequency slot number #4. In step S62, the network controller 2 gives a mark ("rounded rectangle" in this example) to the corresponding cells having the section number and the OXC number for which the optical path #2 and the optical path #3 are set.

Furthermore, the network controller 2 identifies a section or an OXC located most upstream of section numbers or OXC numbers common in combinations of a plurality of optical paths each having a correlation coefficient exceeding a threshold value as a failure location (S63), and terminates the processing in FIG. 10.

In the case of FIG. 14, the section number common in the optical path #2 and the optical path #3 is R, and the OXC numbers common in the optical path #2 and the optical path #3 are C. D, and F. Of these, what is located the most upstream is the OXC-C, and thus the network controller 2 identifies the OXC-C as a suspected location. In this way, it is possible to easily determine in which section or in which node a defect has occurred.

FIG. 11 is a diagram illustrating various DSP-based OPM.

Various DSP-based OPM are broadly classified into transmission line properties, apparatus/device properties, and transponder properties. These are described in "Class" items of the drawing.

The right side of the "Class" item indicates a subclass belonging to each property. Three subclasses, that is, wavelength dispersion, polarization mode dispersion, and state of polarization (SOP), belong to the transmission line properties. The wavelength dispersion is monitored as a wavelength dispersion compensation amount. The polarization mode dispersion is monitored as a polarization mode dispersion compensation amount. The state of polarization (SOP) variation is monitored by a Stokes vector calculated based on the coefficient matrix of two rows and two columns of Multi-Input Multi-Output.

Subclasses, that is, an optical signal to noise ratio (OSNR), a polarization dependent loss (PDL), a crosstalk including reflected light, a fiber non-linear effect, and an inter-symbol interference (ISI), belong to the apparatus/ device properties. The OSNR is monitored as an error vector magnitude (EVM). The PDL (polarization-dependent loss) is monitored as an OSNR difference between X and Y. The crosstalk including reflected light and the ISI are monitored as a tap value (factor) for a finite impulse response (FIR) filter. The fiber non-linear effect is monitored as an auto correlation function between symbols.

Three subclasses, that is, a constellation distortion, a light source frequency, and a spectrum symmetry, belong to the transponder properties. The constellation distortion is monitored as an index value based on a geometric form of constellation. The light source frequency is monitored as a frequency offset amount. The spectrum symmetry is monitored as an index value based on spectrum symmetry.

Figure 12:
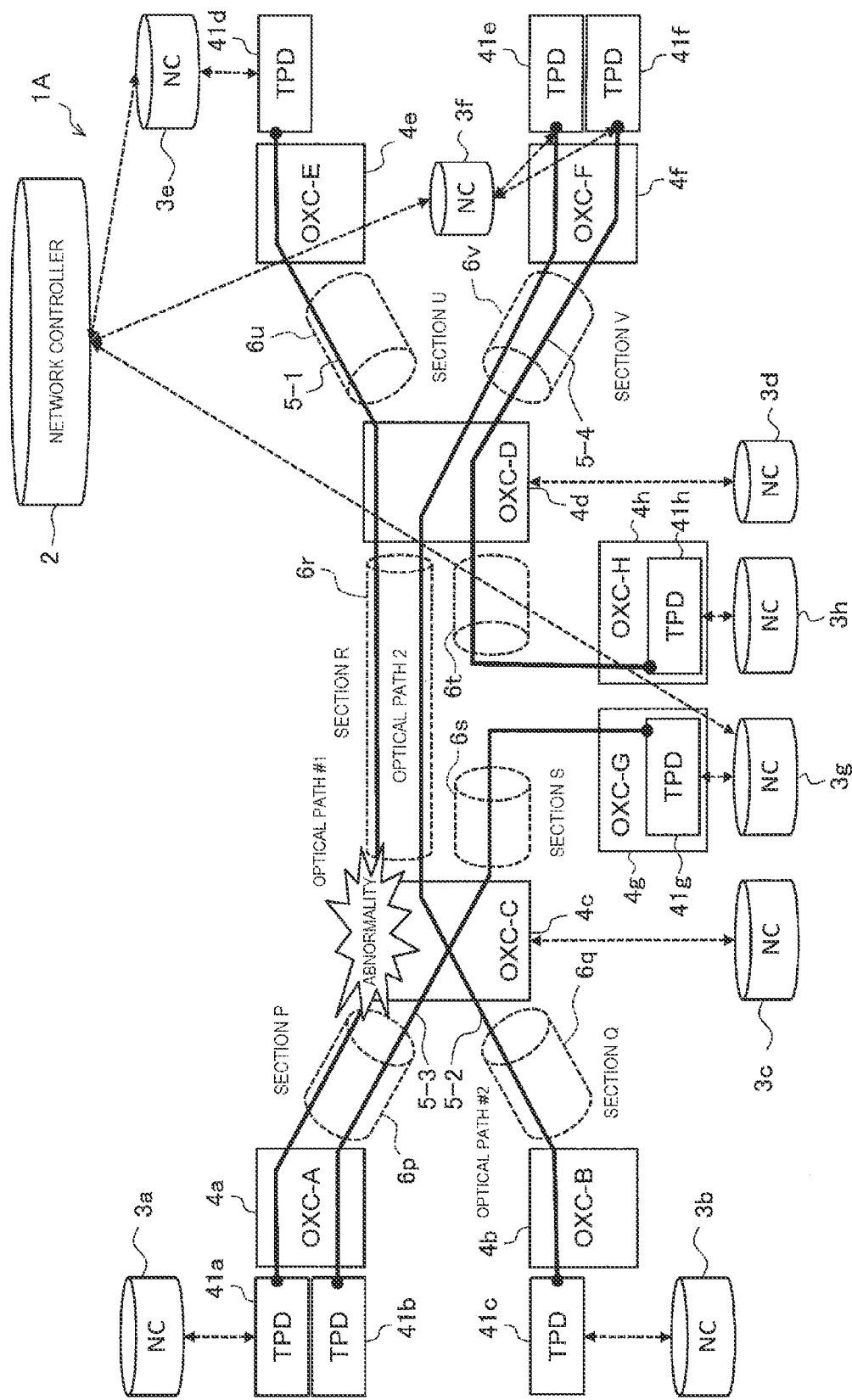
FIG. 12 is a diagram illustrating an operation in which a network controller collects abnormality information or information regarding a degradation mode generated in the optical transmission system.

FIG. 12 is a diagram illustrating an operation in which the network controller 2 collects abnormality information generated in the optical transmission system 1A. FIG. 12 adds the network controller 2 and the operation thereof to the optical transmission system 1A illustrated in FIG. 3.

The node controller 3e monitoring the optical cross connect 4e that serves as an end of the optical path extracts time-series data of the DSP-based OPM related to the degradation mode from the transponder 41d and transfers the extracted data to the network controller 2. The node controller 3f monitoring the optical cross connect 4f that serves as an end of the optical path extracts time-series data of the DSP-based OPM related to the degradation mode from the transponders 41e, 41f and transfers the extracted data to the network controller 2.

Furthermore, the node controller 3g connected externally from the optical cross connect 4g and monitoring the transponder 41g also extracts time-series data of the DSP-based OPM related to the degradation mode and transfers the extracted data to the network controller 2.

The network controller 2 determines a section shared by paths each showing a large correlation and a frequency slot position occupied by the paths, based on section information, path channel information, and use frequency information managed by the network controller 2 itself and the time-series data of the DSP-based OPM collected from each node controller. This allows the network controller 2 to identify that the influence of the fiber non-linear effect at the section 6r has changed due to a power setting abnormality at the optical cross connect 4c.

Hereinafter, identification of a failure component in a node and a cause by failure diagnosis when the network controller 2 determines that a defect has occurred at the node will be explained with reference to FIGS. 15 to 17.

Figure 15:
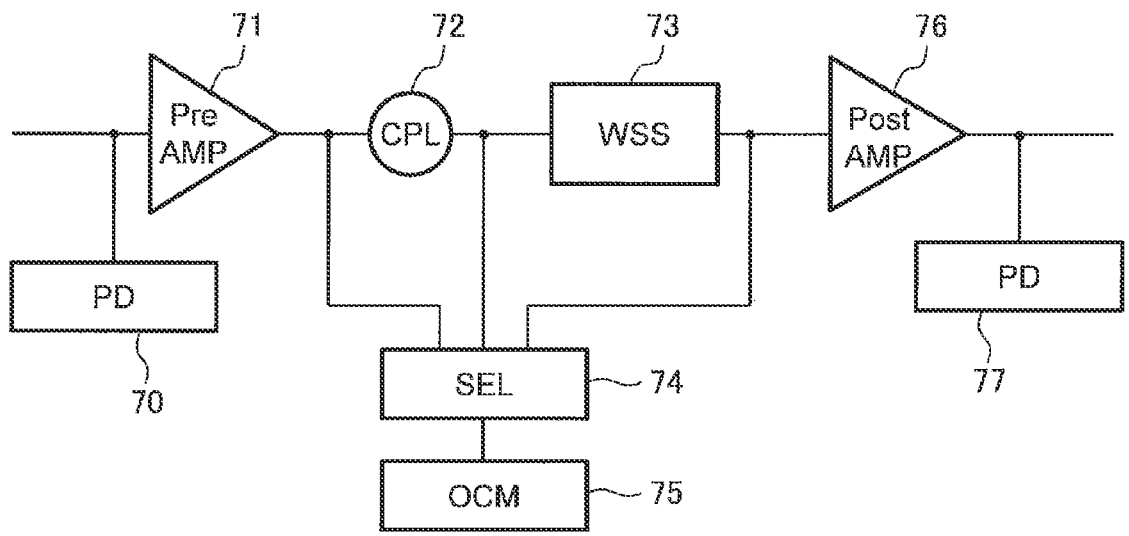
FIG. 15 is a diagram illustrating internal components of a suspected apparatus.

FIG. 15 is a diagram illustrating components in the node 4.

The node 4 includes components such as a pre-amplifier 71, a photodetector (PD) 70, a coupler (CPL) 72, a wavelength selective switch 73, a post-amplifier 76, a photodetector 77, a selector (SEL) 74, and an optical channel monitor (OCM) 75.

The photodetector 70 is connected to the input side of the pre-amplifier 71. The output side of the pre-amplifier 71 is connected to the input side of the post-amplifier 76 via the coupler 72 and the wavelength selective switch 73. The selector 74 selects any one of the output of the pre-amplifier 71, the output of the coupler 72, and the output of the wavelength selective switch 73, and outputs the selected output to the optical channel monitor 75.

The optical detector 77 is connected to the output side of the post-amplifier 76.

The node controller 3 acquires PM information only from a relevant node. This is different from a method in which the network controller 2 collects PM information from all nodes as in the related art. In this way, load on the network controller 2 side and congestion of the data communication network can be avoided, and the sampling interval in the acquisition of time-series data of PM information can be reduced.

The node controller 3 acquires an optical power from the photodetectors 70, 77. The node controller 3 acquires a temperature and a laser bias current value from the pre-amplifier 71 and the post-amplifier 76. The node controller 3 acquires an optical power in a channel unit from the optical channel monitor 75, and acquires a temperature and an attenuation amount of light from the wavelength selective switch 73.

Figure 16:
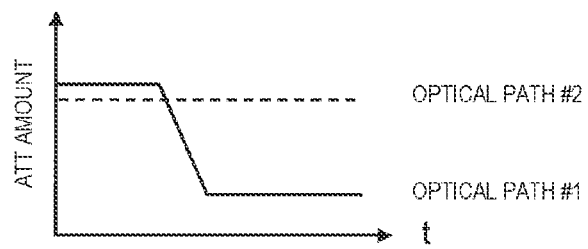
FIG. 16 is a graph illustrating an amount of attenuation of each optical path in the suspected apparatus.

FIG. 16 is a graph illustrating the attenuation amount of light for each optical path in a suspected apparatus.

In the case assumed this time, the amount of attenuation of the optical path #1 of the wavelength selective switch 73 is an abnormal value at a predetermined timing.

Figure 17:
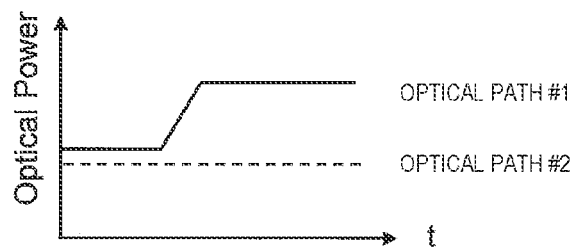
FIG. 17 is a graph illustrating an optical power of each optical path in the suspected apparatus.

FIG. 17 is a graph illustrating the optical power of each optical path in the suspected apparatus.

Figure 18:
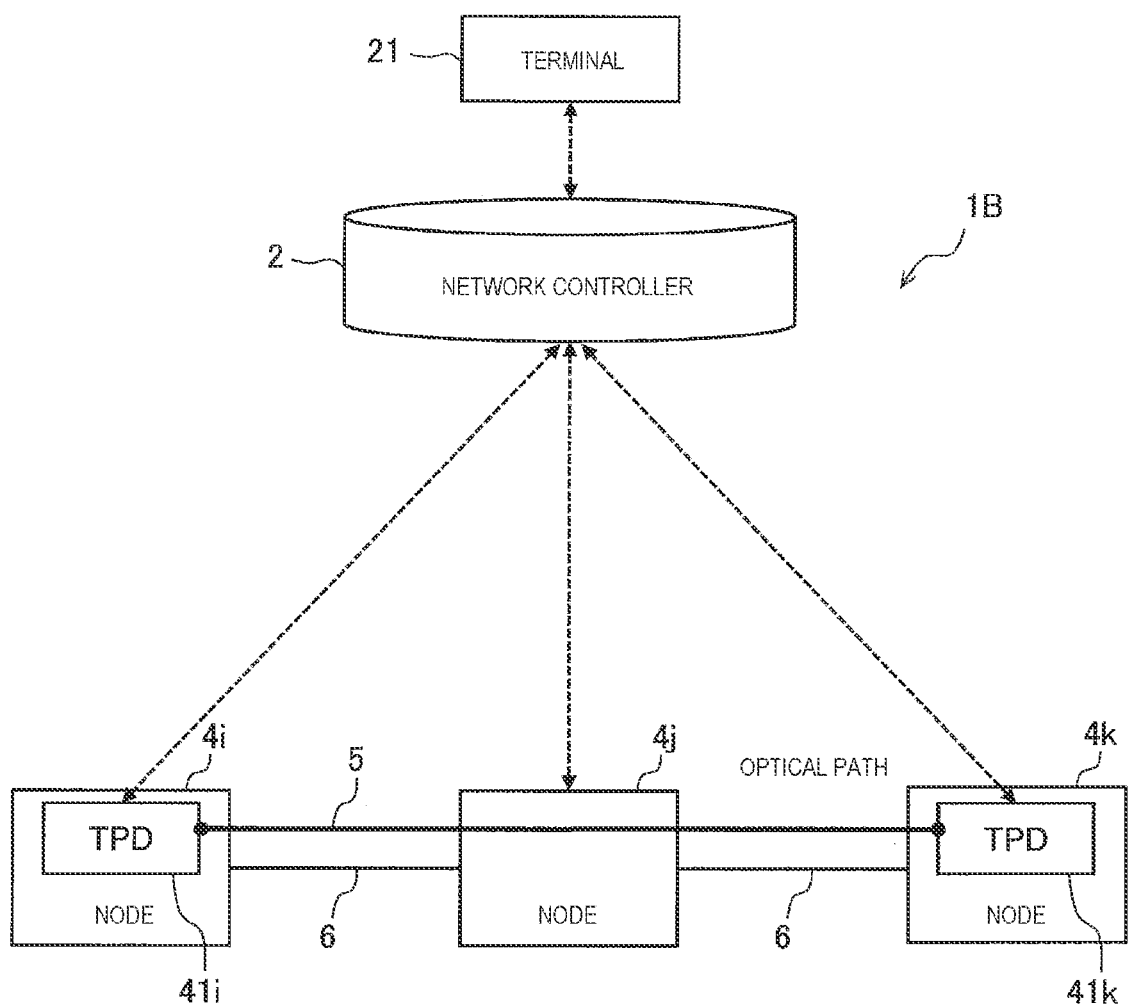
FIG. 18 is a conceptual diagram of an optical transmission system according to a second embodiment.

In the case assumed this time, the power of the optical path #1 in a channel unit in the optical channel monitor 75 is also an abnormal value at the predetermined timing described above. With reference to FIGS. 17 and 18, the node controller 3 can determine that there is an abnormality in a package (component) of the wavelength selective switch in the optical cross connect 4c. Further, when each node controller 3 rather than the network controller 2 performs failure determination, it is possible to improve data resolution and avoid tightness of the processing of the network controller 2.

FIG. 18 is a conceptual diagram of an optical transmission system 1B of a second embodiment.

An optical transmission system 1 includes a plurality of nodes 4i to 4k interconnected by an optical fiber 6 which is an optical transmission line and further includes a network controller 2. A transponder 41i included in the node 4i and a transponder 41k included in the node 4k are communicatively connected by an optical path 5. The optical path 5 is a logical communication line that connects the transponder 41i and the transponder 41k via the optical fiber 6, which is a physical communication line, and the node 4j.

The transponders 41i, 41k each include a chip for digital signal processing (DSP) therein, and use an excess resource of the chip to implement a function of monitoring time-series data of a correlation coefficient to identify a failure mode. The transponders 41i, 41k each execute a program for realizing a controller function of monitoring a node to monitor themselves to detect degradation of signal quality, identify time-series data of photophysical properties correlated with time-series data of the signal quality, and determine a degradation mode. The node 4j monitors itself to detect degradation of signal quality, identify time-series data of photophysical properties correlated with the time-series data of the signal quality, and determine the degradation mode. The transponders 41i, 41k and the node 4j function as determination units for detecting degradation of signal quality, identifying time-series data of photophysical properties correlated with time-series data of the signal quality, and determining a degradation mode.

The network controller 2 is connected to the transponders 41i, 41k and the node 4j via a data communication network. The network controller 2 controls and monitors the transponders 41i, 41k and the node 4j. The network controller 2 identifies a node or a component in which a failure or performance degradation has occurred based on the node for which the transponders 41*i*, 41*k* and the node 4*j* have detected degradation of signal quality, a degradation mode, a topology of the nodes, and information on optical paths set between the nodes 4. A terminal 21 is connected to the network controller 2 to notify a user of, for example, a failure position or a cause.

According to the second embodiment, each transponder 41 and each node 4 can autonomously detect degradation of signal quality by being caused to execute a program realizing the node controller function without providing a node controller as hardware.

Modification Example

The present invention is not limited to the above-described embodiments, and may be modified without departing from the gist of the present invention. Examples of the modification include the following (a) to (c).
(a) The topology of the optical transmission system is not limited to those illustrated in FIGS. 3 and 12.
(b) The method for detecting quality degradation of a signal flowing through an optical path is not limited to detecting an abnormality with respect to time-series data of the Pre-FEC BER, and may be any method for detecting an abnormality by measuring signal quality digitally.
(c) The feature amount detected by the node controller is not limited to those listed in the embodiments, and may be any amount correlated with a failure of anode (apparatus) or an optical transmission line.

REFERENCE SIGNS LIST 1, 1A Optical transmission system
2 Network controller
21 Terminal
3, 3*i* to 3*k* Node controller
4, 4*i* to 4*k* Node
4*a* to 4*f* Optical cross connect
41, 41*a* to 41*k* Transponder
5, 5-1 to 5-4 Optical path
6 Optical fiber
6*p* to 6*v* Section (optical transmission line)

The invention claimed is:
1. An optical transmission system, comprising:
a plurality of nodes interconnected by an optical transmission line, wherein each of the plurality of nodes is an optical cross connect through which optical signals of a plurality of frequency slots pass;
a plurality of determination units, each including one or more processors and configured to detect degradation of signal quality at each of the plurality of nodes, identify time-series data of photophysical properties correlated with time-series data of the signal quality, and determine a degradation mode; and
a network controller, including one or more processors, configured to identify a node or a component in which a failure or performance degradation has occurred based on a node for which a determination unit of the plurality of determination units has detected degradation of the signal quality, the degradation mode, a network topology formed of the plurality of nodes, and information on optical paths set between the plurality of nodes, wherein the network controller is configured to collect time-series data of a photophysical property corresponding to the degradation mode from a determination unit of the plurality of determination units that is configured to manage a node serving as an end of each of optical buses to compute a correlation coefficient matrix between optical paths and identify a most upstream node of nodes common to combinations of optical paths having a correlation coefficient exceeding a threshold value as a suspected location related to a failure or performance degradation.

2. The optical transmission system according to claim 1, wherein each of the plurality of determination units is configured to, upon detecting degradation of the signal quality, determine a correlation between a photophysical property and the signal quality over a predetermined period of time before and after a detected timing.

3. The optical transmission system according to claim 1, wherein the determination unit is a node controller configured to manage a node or a component for which degradation of the signal quality has been detected.

4. The optical transmission system according to claim 1, wherein the determination unit is a transponder provided in a node in which degradation of the signal quality has been detected.

5. The optical transmission system according to claim 1, wherein the time-series data of the photophysical property correlated with time-series data of the signal quality includes at least one selected from the group consisting of time-series data of a wavelength dispersion compensation amount, time-series data of a polarization mode dispersion compensation amount, time-series data of a state of polarization (SOP), time-series data of a signal-to-noise ratio, time-series data of a polarization-dependent loss, time-series data of crosstalk, time-series data of a fiber non-linear effect, time-series data of inter-symbol interference, time-series data of constellation distortion, time-series data of a light source frequency, and time-series data of spectrum symmetry.

6. An optical transmission system, comprising:
a plurality of nodes interconnected by an optical transmission line;
a plurality of determination units, each including one or more processors and configured to detect degradation of signal quality at each of the plurality of nodes, identify time-series data of photophysical properties correlated with time-series data of the signal quality, and determine a degradation mode; and
a network controller, including one or more processors, configured to identify a node or a component in which a failure or performance degradation has occurred based on a node for which a determination unit of the plurality of determination units has detected degradation of the signal quality, the degradation mode, a network topology formed of the plurality of nodes, and information on optical paths set between the plurality of nodes;
wherein the determination unit is configured to manage a node or a component for which degradation of the signal quality has been detected and a cause of a failure in the node or the component is diagnosed based on time-series data of an attenuation amount of light applied to an optical signal constituting each of the optical paths and passing through the node, or time-series data of optical power.

7. A failure diagnosis method, performed by an optical transmission system comprising a plurality of nodes interconnected by an optical transmission line, management units each configured to manage each of the plurality of nodes, and a network controller configured to comprehensively manage the management units, the method comprising:
determining, by the management units, a degradation mode by detecting a degradation of signal quality in a nodes of the plurality of nodes and identifying time-series data of a photophysical property correlated with time-series data of the signal quality; and identifying, by the network controller, a node or component in which a failure or performance degradation has occurred based on a node for which the management units have detected degradation of the signal quality, the degradation mode, a network topology formed of the plurality of nodes, and information on optical paths set between the plurality of nodes, wherein the time-series data of the photophysical property correlated with time-series data of the signal quality includes at least one selected from the group consisting of time-series data of a wavelength dispersion compensation amount, time-series data of a polarization mode dispersion compensation amount, time-series data of a state of polarization (SOP), time-series data of a signal-to-noise ratio, time-series data of a polarization-dependent loss, time-series data of crosstalk, time-series data of a fiber non-linear effect, time-series data of inter-symbol interference, time-series data of constellation distortion, time-series data of a light source frequency, and time-series data of spectrum symmetry.

8. The failure diagnosis method according to claim 7, further comprising: determining, by each of the plurality of determination units, upon detecting degradation of the signal quality, a correlation between a photophysical property and the signal quality over a predetermined period of time before and after a detected timing.

9. The failure diagnosis method according to claim 7, wherein the determination unit is a node controller configured to manage a node or a component for which degradation of the signal quality has been detected.

10. The optical transmission system according to claim 9, wherein a cause of a failure in the node or the component is diagnosed based on time-series data of an attenuation amount of light applied to an optical signal constituting each of the optical paths and passing through the node, or time-series data of optical power.

11. The failure diagnosis method according to claim 7, wherein the determination unit is a transponder provided in a node in which degradation of the signal quality has been detected.

12. The failure diagnosis method according to claim 7, wherein:

each of the plurality of nodes is an optical cross connect through which optical signals of a plurality of frequency slots pass; and the method further comprises:

collecting, by the network controller, time-series data of a photophysical property corresponding to the degradation mode from a determination unit of the plurality of determination units that is configured to manage a node serving as an end of each of optical buses to compute a correlation coefficient matrix between optical paths; and identifying, by the network controller, a most upstream node of nodes common to combinations of optical paths having a correlation coefficient exceeding a threshold value as a suspected location related to a failure or performance degradation.

* * * * *